United States Patent [19]
Mundie et al.

[11] Patent Number: 6,003,428
[45] Date of Patent: Dec. 21, 1999

[54] ELECTRO-PNEUMATIC PRESSURE CONTROL SYSTEM FOR WELDING AND LIKE APPARATUS

[75] Inventors: Paul D. Mundie; David M. Phillips, both of Indianapolis, Ind.

[73] Assignee: SMC Pneumatics, Inc., Indianapolis, Ind.

[21] Appl. No.: 09/121,787

[22] Filed: Jul. 24, 1998

[51] Int. Cl.[6] .......................... F15B 13/044; F15B 11/08
[52] U.S. Cl. ................................. 91/459; 91/465
[58] Field of Search .............................. 91/459, 462, 464, 91/465

[56] References Cited

U.S. PATENT DOCUMENTS

| | | | |
|---|---|---|---|
| 4,444,090 | 4/1984 | Joelson | 91/465 X |
| 4,628,499 | 12/1986 | Hammett | 91/459 X |
| 4,813,339 | 3/1989 | Uno et al. | 91/459 |
| 4,932,311 | 6/1990 | Mibu et al. | 91/459 X |
| 5,287,699 | 2/1994 | Takamura et al. | 91/459 X |
| 5,497,805 | 3/1996 | Sunamura et al. | 91/459 X |
| 5,542,336 | 8/1996 | Larkin | 91/459 X |

OTHER PUBLICATIONS

SMC Electro–Pneumatic Regulator E–P HYREG, Series VY Catalog, Cat. E 136–A, 1995.
SMC ISO Interface Solenoid Valve, Series VSR8/VSS8, Cat. E '140–B, 1995.

*Primary Examiner*—Hoang Nguyen
*Attorney, Agent, or Firm*—Bose McKinney & Evan LLP

[57] ABSTRACT

An electro-pneumatic control system pneumatically connected to a pressure source and electrically connected to an electrical signal source includes a selector switch having an electrical input connected to the electrical signal source, and having a first electrical output and a second electrical output. The system further includes a body having a movable member positioned therein, wherein the body has a first port and a second port; a first regulator valve having a bidirectional port connected to the first port of the body, having an input port connected to the pressure source, having an exhaust port, and having an electrical actuator connected to the first electrical output of the selector switch; and a second regulator valve having a bidirectional port connected to the second port of the body, having an input port connected to the pressure source, having an exhaust port, and having an electrical actuator connected to the second electrical output of the selector switch.

16 Claims, 1 Drawing Sheet

ELECTRO-PNEUMATIC PRESSURE CONTROL SYSTEM FOR WELDING AND LIKE APPARATUS

TECHNICAL FIELD OF THE INVENTION

This invention relates generally to pneumatic control systems, and more particularly, to a system including electro-pneumatic regulator valves which control the pneumatic pressure exerted by an operating arm, which can be used in welding and like applications.

BACKGROUND OF THE INVENTION

Control of a 3-port weld cylinder is a difficult problem which to date still has problems due to the technology used. The current technology used in the field has not been updated for approximately twenty years. It was discovered that using this current technology would not solve the current control problems inherent in a 3-port weld cylinder. Therefore, an update to the latest technology was required.

The current method of controlling a 3-port weld gun is to have a bank of manually adjusted regulators, all preset to specific pressures and mounted to solenoid valves so that when a specific valve is turned on, that particular preset pressure is applied to the weld gun. The selected pressure and the line pressure are sent to a 5-port, 2-way solenoid valve. In one position, the preset pressure is sent to the extend port of the cylinder while the return port is exhausted. In the other position, the return port is pressurized with the line pressure while the extend port is exhausted. An alternative method currently used is to have one preset pressure sent to the 5-port, 2-way solenoid valve. In one position, the preset pressure is sent to the extend port of the cylinder while the return port is exhausted. In the other position, the return port is pressurized with the preset pressure while the extend port is exhausted.

The current method only allows a discrete set of preselected pressures to be applied to the weld gun. Addition of another discrete selectable pressure requires adding another valve to the control system which can be expensive and time consuming depending on space and other factors. The larger this discrete set of pressures is made the larger, heavier, and more unwieldy the pressure control system becomes. The further a valve is from the system to be controlled the longer it takes for a change in pressure to be applied by the controlled system.

SUMMARY OF THE INVENTION

Through the use of electro-pneumatic regulator valves, the present invention allows variable pressure control through two regulator valves, as opposed to a bank of preset regulator valves. The invention, in one embodiment thereof, is directed to an electro-pneumatic control system pneumatically connected to a pressure source and electrically connected to an electrical signal source. The electro-pneumatic control system includes a selector switch having an electrical input connected to the electrical signal source, and having a first electrical output and a second electrical output; a body having a movable member positioned therein, the body having an first port and a second port; a first regulator valve having a bidirectional port connected to the second port of the body, having an input port connected to the pressure source, having an exhaust port, and having an electrical actuator connected to the first electrical output of the selector switch; and a second regulator valve having a bidirectional port connected to the first port of the body, having an input port connected to the pressure source, having an exhaust port, and having an electrical actuator connected to the second electrical output of the selector switch. During operation of the invention, one of the first regulator valve or the second regulator valve is selected with the selector switch as an activated regulator valve, and the other is selected with the selector switch as a non-activated regulator valve. An air flow in the activated regulator valve is from the input port of the activated regulator valve to the bidirectional port of the activated regulator valve, and an air flow in the non-activated regulator valve is from the bidirectional port of the non-activated regulator valve to the exhaust port of the non-activated regulator valve.

One advantage of the present invention over manually operated set regulators is that electro-pneumatic valves offer quick change of set pressures via a change in the electrical command signal. The pressure applied by the electro-pneumatic regulator valves is proportional to the level of the electrical signal applied to the valve. The prior technology limited the applied pressure to a discrete set of pressures available from the bank of preset regulators, additional pressures requiring the addition of additional regulator valves to the bank.

A further advantage of the present invention is improved quality and quantity of welds. By using one electro-pneumatic regulator valve to control pressure on one side of a cylinder's piston in a welding apparatus and another electro-pneumatic regulator valve to control pressure on the opposite side of the cylinder's piston, the present invention allows the pneumatic pressure used to position the piston to a retracted position to be controlled independently of the pneumatic pressure used to position the piston to an extended position which can improve the quality and quantity of welds. This also provides the added advantage of having variable pressures applied on both sides of the extend/return piston and yet only requiring the use of two valves.

Another advantage of the present invention over manually operated set regulators is that the electro-pneumatic valves can be fully controlled via a PLC computer. The electronic controls can be used to extend the working life of the weld cylinder.

Still another advantage of the present invention over manually operated set regulators is that the electro-pneumatic valves offer higher accuracy, better repeatability and faster response. These features also improve weld quality and quantity.

Yet another advantage of the present invention over manually operated set regulators is that the electro-pneumatic valves have a smaller size assembly, and that a pair of electro-pneumatic regulator valves can replace a bank of regulator valves. This allows mounting the valves closer to the weld cylinder which increases the speed of response.

Additional objects, advantages and novel features of the invention are set forth in the description that follows, and will become apparent to those skilled in the art upon reviewing the drawings in connection with the following description.

DESCRIPTION OF THE PREFERRED EMBODIMENT

Figure 1:
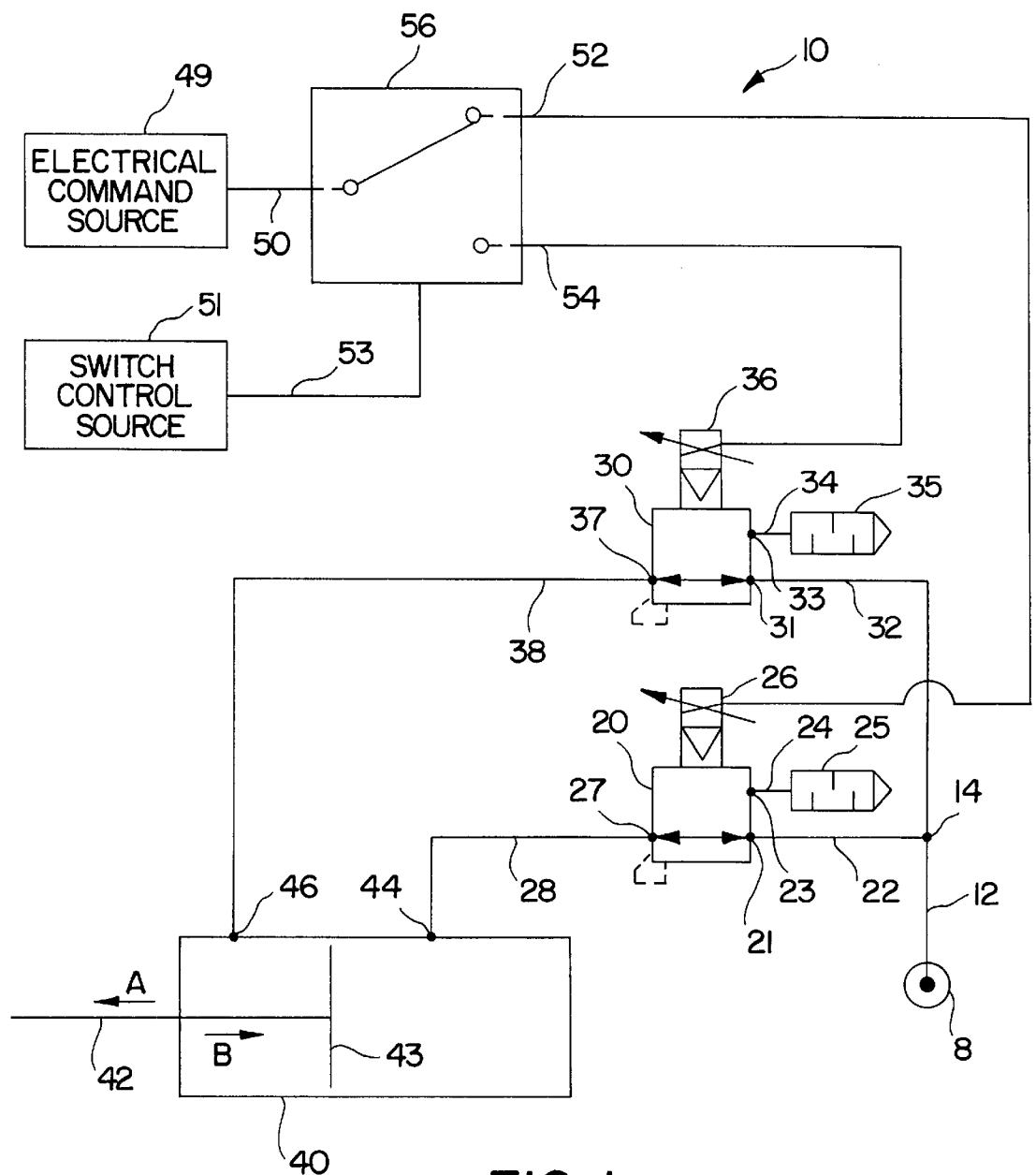
FIG. 1 is a block diagram of the electro-pneumatic control system.

An electro-pneumatic control system 10 in accordance with the principles of the present invention is shown in FIG.

1. Control system 10 includes a first electro-pneumatic regulator valve 20, a second electro-pneumatic regulator valve 30, a selector switch module 56 and an air cylinder 40. The first electro-pneumatic regulator valve 20 includes an electronic actuator 26, an input port 21, an exhaust port 23 and a bidirectional port 27. The second electro-pneumatic regulator valve 30 includes an electronic actuator 36, an input port 31, an exhaust port 33 and a bidirectional port 37. The selector switch module 56 has an input line 50, a switch control input 53, a first output line 52 and a second output line 54. The air cylinder 40 has an operating rod 42 attached to a cylinder piston 43, an extend port 44, a return port 46.

Pressurized air is supplied to the electro-pneumatic control system 10 from a suitable line pressure source 8. The electro-pneumatic control system 10 supplies pressurized air through either the first or second electro-pneumatic regulator valve 20, 30 to the air cylinder 40 to control the extension and return of the operating rod 42 which can be connected to a welding device, or other like apparatus to be operated. When the pressurized air is supplied to the extend port 44 of the air cylinder 40, the operating rod 42 is moved out of the air cylinder 40 in the direction of arrow A. When the pressurized air is supplied to the return port 46 of the air cylinder 40, the operating rod 42 is moved into the air cylinder 40 in the direction indicated by arrow B.

The electrical command signal of the electro-pneumatic control system 10 is supplied by an electrical command source 49 through the input line 50 of the selector switch module 56. The selector switch module 56 includes two output lines 52, 54. A switch control source 51 supplies a switch control signal to the switch control input line 53 which connects the electrical command signal on the input line 50 to either the first output line 52 or the second output line 54.

The electronic actuator 26 of the first electro-pneumatic regulator valve 20 is connected to the first output line 52 of selector switch module 56. The input port 21 of the first electro-pneumatic regulator valve 20 is connected to the line pressure 8 through air conduits 12 and 22 and conduit junction 14, the exhaust port 23 of the first electro-pneumatic regulator valve 20 is connected to an exhaust silencer 25 through air conduit 24, and the bidirectional port 27 of the first electro-pneumatic regulator valve 20 is connected to the extend port 44 of the air cylinder 40 via an air conduit 28.

The electronic actuator 36 of the second electro-pneumatic regulator valve 30 is connected to the second output line 54 of selector switch module 56. The input port 31 of the second electro-pneumatic regulator valve 30 is connected to the line pressure 8 through air conduits 12 and 32 and conduit junction 14, the exhaust port 33 of the second electro-pneumatic regulator valve 30 is connected to an exhaust silencer 35 through air conduit 34, and the bidirectional port 37 of the second electro-pneumatic regulator valve 30 is connected to the return port 46 of the air cylinder 40 via an air conduit 38.

Electro-pneumatic regulator valves 20, 30 can be, for example, the E-P HYREG model VY1400 made by SMC Pneumatics, Inc. Such valves provide a pressure output which is proportional to the signal line (voltage or current) supplied to the valve actuator.

The electrical command signal is supplied by the electrical command source 49 through the input line 50 of the selector switch module 56 to one of the regulator valves 20, 30 to control the variable pressure supplied to the extend port 44 and the return port 46 of the air cylinder 40, respectively. The switch control source 51 supplies a signal on the switch control input line 53 which commands the selector switch module 56 to connect the electrical command signal on the input line 50 to either the first output line 52 or the second output line 54. The selector switch module 56 can be, for example, one of many single pole double throw electrical relays or electromechanical switching devices which are well known in the art.

When the selector switch module 56 is commanded by switch control source 51 to connect the electrical command signal on input line 50 to the first output line 52, the first electro-pneumatic regulator valve 20 is activated and the second electro-pneumatic regulator valve 30 is non-activated. This directs the air flow from the line pressure source 8 through the first electro-pneumatic regulator valve 20 into the extend port 44 of the air cylinder 40 which extends the operating arm 42 out of the air cylinder 40 in the direction indicated by arrow A. The movement of operating arm 42 out of the air cylinder 40 in the direction of arrow A pushes air out of air cylinder 40 through return port 46, this air flow passes through the second electro-pneumatic regulator valve 30 and out of the control system 10 through exhaust silencer 35. The result being the extension of operating arm 42 out of air cylinder 40 in the direction indicated by arrow A. The variable pressure supplied to the extend port 44 of the air cylinder 40 being controlled by the level of the electrical command signal supplied by electrical command source 49 through the input line 50 of selector switch 56.

More specifically, when the selector switch module 56 connects the electrical command signal on the input line 50 to the first output terminal 52, the electrical command signal activates the first electro-pneumatic regulator control valve 20 through electrical actuator 26, putting first electro-pneumatic regulator valve 20 in an activated condition. This permits air flow from the line pressure source 8 through air conduit 12, conduit junction 14 and air conduit 22 into the input port 21 of the first electro-pneumatic regulator valve 20. This air flow then exits the first electro-pneumatic regulator valve 20 through bidirectional port 27 and passes through air conduit 28 into the extend port 44 of the air cylinder 40. Thus, air flow from the line pressure source 8 is directed to the extend port 44 of the air cylinder 40 which increases the pressure on the extend port side of a piston 43 in the air cylinder 40. This increased pressure moves the piston 43 and operating rod 42 in the direction indicated by arrow A.

During this same period, when the selector switch module 56 connects the input line 50 to the first output terminal 52, no electrical command signal is received by the electronic actuator 36 of the second electro-pneumatic regulator valve 30, and thus, the second electro-pneumatic regulator valve 30 is in a non-activated condition. When the second electro-pneumatic regulator valve 30 is in the non-activated condition, air flow through the input port of the second electro-pneumatic regulator valve 30 is blocked, however air flow entering through the bidirectional port 37 of the second electro-pneumatic regulator valve 30 is permitted to exit through of the exhaust port 33 of the second electro-pneumatic regulator valve 30 which would pass through air conduit 34 and exit the control system 10 through exhaust silencer 35. The bidirectional port 37 of the second electro-pneumatic regulator valve 30 is connected to the return port 46 of the air cylinder 40 through air conduit 38. Thus, air flow caused by the movement of piston 43 in the direction of arrow A is permitted out of air cylinder 40 through return port 46, through air conduit 38 into the second electro-pneumatic regulator valve 30 through bidirectional port 37 and out of the second electro-pneumatic regulator valve 30 through exhaust port 33, and finally out of control system 10 through air conduit 34 and exhaust silencer 35.

The switch control source 51 may also supply a switch control input signal which causes the selector switch module 56 to connect the input line 50 to the second terminal 54, at which time the second electro-pneumatic regulator valve 30 is activated and the first electro-pneumatic regulator valve 20 is non-activated. This directs the air flow from the line pressure source 8 through the second electro-pneumatic regulator valve 30 into the return port 46 of the air cylinder 40 which retracts the operating arm 42 into the air cylinder 40 in the direction indicated by arrow B. The movement of operating arm 42 into the air cylinder 40 in the direction of arrow B pushes air out of air cylinder 40 through extend port 44, this air flow passes through the first electro-pneumatic regulator valve 20 and out of the control system 10 through exhaust silencer 25. The result being the retraction of operating arm 42 into air cylinder 40 in the direction indicated by arrow B. The variable pressure supplied to the return port 46 of the air cylinder 40 is controlled by the level of the electrical command signal supplied by electrical command source 49 through the input line 50 of selector switch module 56.

More specifically, when selector switch module 56 is switched to the other position, connecting the electrical command signal on input line 50 to the second output line 54, the electrical command signal activates the second electro-pneumatic regulator control valve 30 through electrical actuator 36, putting second electro-pneumatic regulator valve 30 in an activated condition. This permits air flow from the line pressure source 8 through air conduit 12, conduit junction 14 and air conduit 32 into the input port 31 of the second electro-pneumatic regulator valve 30, this air flow then exits the second electro-pneumatic regulator valve 30 through bidirectional port 37 and passes through air conduit 38 into the return port 46 of the air cylinder 40. Thus, air flow from the line pressure source 8 is directed to the return port 46 of the air cylinder 40 which moves the piston 43 and operating rod 42 in the direction indicated by arrow B.

During this same period, when the selector switch module 56 connects the input line 50 to the second output terminal 54, no electrical command signal is received by the electronic actuator 26 of the first electro-pneumatic regulator valve 20, and thus, the first electro-pneumatic regulator valve 20 is in a non-activated condition. When the first electro-pneumatic regulator valve 20 is in the non-activated condition, air flow through the input port of the first electro-pneumatic regulator valve 20 is blocked, however air flow entering through the bidirectional port 27 of the first electro-pneumatic regulator valve 20 is permitted to exit through of the exhaust port 23 of the first electro-pneumatic regulator valve 20 which would pass through air conduit 24 and exit the control system 10 through exhaust silencer 25. The bidirectional port 27 of the first electro-pneumatic regulator valve 20 is connected to the extend port 44 of the air cylinder 40 through air conduit 28. Thus, air flow caused by the movement of piston 43 in the direction of arrow B is permitted out of air cylinder 40 through extend port 44, through air conduit 28 into the first electro-pneumatic regulator valve 20 through bidirectional port 27 and out of the first electro-pneumatic regulator valve 20 through exhaust port 23, and finally out of the control system 10 through air conduit 24 and exhaust silencer 25.

The selector switch module 56 is controlled by switch control source 51 such that the electrical command signal supplied by electrical command source 49 on input line 50 is only connected to one of the switch terminals 52, 54 at any one time. In this way, the electrical command signal is received by only one of the electronic actuators 26, 36 and only one of the electro-pneumatic regulator valves 20, 30 will be activated at any one time. Thus, when the first electro-pneumatic regulator 20 is in an activated condition the second electro-pneumatic regulator 30 is in a non-activated condition, and vice versa The electrical command source 49 supplying the electrical command signal can be a PLC computer. The switch control source can also be a PLC computer, providing full remote control of the electro-pneumatic control system 10.

It will be understood by those skilled in the art that various modifications can be made to the system disclosed in this application without departing from the spirit and scope of the invention as set forth in the claims attached hereto.

What is claimed is:

1. An electro-pneumatic control system pneumatically connected to a pressure source and electrically connected to an electrical signal source, comprising:

a selector switch having an electrical input connected to said electrical signal source, and having a first electrical output and a second electrical output;

a body having a movable member positioned therein, said body having a first port and a second port;

a first regulator valve having a bidirectional port connected to said first port of said body, having an input port connected to said pressure source, having an exhaust port, and having an electrical actuator connected to said first electrical output of said selector switch; and a second regulator valve having a bidirectional port connected to said second port of said body, having an input port connected to said pressure source, having an exhaust port, and having an electrical actuator connected to said second electrical output of said selector switch.

2. The system of claim 1, wherein one of said first regulator valve and said second regulator valve is selected with said selector switch as an activated regulator valve, and the other is selected with said selector switch as a non-activated regulator valve, wherein an air flow in said activated regulator valve is from the input port of said activated regulator valve to the bidirectional port of said activated regulator valve, and an air flow in said non-activated regulator valve is from the bidirectional port of said non-activated regulator valve to the exhaust port of said non-activated regulator valve.

3. The system of claim 2, wherein the air flow through the non-activated regulator valve is unregulated.

4. The system of claim 1, wherein said body is a pneumatic cylinder and said movable member is a piston attached to an extendably accessible shaft.

5. The system of claim 4, wherein said first port is an extend port which, when pneumatic pressure is applied thereto, forces said piston towards a first end of said cylinder, and wherein said second port is a return port which, when pneumatic pressure is applied thereto, forces said piston toward a second end of said cylinder.

6. An electro-pneumatic control system pneumatically connected to a pressure source and electrically connected to an electrical signal source, comprising:

a selector switch having an electrical input connected to said electrical signal source, and having a first electrical output and a second electrical output;

a cylinder having a movable piston positioned therein, said cylinder having an extend port and a return port;

a first regulator valve having a bidirectional port connected to said extend port of said cylinder, having an input port connected to said pressure source, having an exhaust port, and having an electrical actuator connected to said first electrical output of said selector switch; and a second regulator valve having a bidirectional port connected to said return port of said cylinder, having an input port connected to said pressure source, having an exhaust port, and having an electrical actuator connected to said second electrical output of said selector switch, wherein one of said first regulator valve and said second regulator valve is selected with said selector switch as an activated regulator valve, and the other is selected with said selector switch as a non-activated regulator valve, wherein an air flow in said activated regulator valve is from the input port of said activated regulator valve to the bidirectional port of said activated regulator valve, and an air flow in said non-activated regulator valve is from the bidirectional port of said non-activated regulator valve to the exhaust port of said non-activated regulator valve.

7. An electro-pneumatic pressure control system pneumatically connected to a pressure source and electrically connected to an electrical command signal source which provides a switch control signal and a level control signal, the electro-pneumatic pressure control system comprising:

a pressure controlled device having a cavity and having a control mechanism which effectively separates the cavity into a first section and a second section, the pressure controlled device having a first port in the first section of the cavity and a second port in the second section of the cavity, the control mechanism having a first face and a second face, the first face facing the first section of the cavity and the second face facing the second section of the cavity;

a selector switch module having an input terminal connected to the electrical command signal source for receiving the level control signal, a control terminal connected to the electrical command signal source for receiving the switch control signal, a first output terminal and a second output terminal, the selector switch module having a first position connecting the input terminal to the first output terminal and a second switch position connecting the input terminal to the second output terminal, the position of the selector switch being controlled by the switch control signal;

a first regulator valve having an electronic actuator connected to the first output terminal of the selector switch, a bidirectional port connected to the first port of the pressure control device, an input port connected to the pressure source and an exhaust port; and a second regulator valve having an electronic actuator connected to the second output terminal of the selector switch, a bidirectional port connected to the second port of the pressure control device, an input port connected to the pressure source and an exhaust port.

8. The system of claim 7, wherein placing the selector switch in the first switch position places the first regulator valve in an activated state wherein fluid pressure from the pressure source is directed from the input port of the first regulator valve to the bidirectional port of the first regulator valve, and places the second regulator valve in a non-activated state wherein fluid pressure from the bidirectional port of the second regulator valve is directed to the exhaust port of the second regulator valve, and, wherein placing the selector switch in the second switch position places the second regulator valve in an activated state wherein fluid pressure from the pressure source is directed from the input port of the second regulator valve to the bidirectional port of the second regulator valve, and places the first regulator valve in a non-activated state wherein fluid pressure from the bidirectional port of the first regulator valve is directed to the exhaust port of the first regulator valve.

9. The control system of claim 8, wherein the control mechanism is a cylinder piston having an operating arm attached thereto, such that when fluid pressure on the first face of the cylinder piston exceeds fluid pressure on the second face of the cylinder piston, the operating arm is extended outward from the pressure controlled device and when fluid pressure on the second face of the cylinder piston exceeds fluid pressure on the first face of the cylinder piston, the operating arm is retracted into the pressure controlled device.

10. The control system of claim 8, wherein one of the voltage level and current level of the level control signal supplied by the electrical command signal source controls the fluid pressure communicated from the input port of the regulator valve in the activated state to the bidirectional port of the regulator valve in the activated state.

11. The control system of claim 10, wherein the electrical command signal source is a computer, such that the computer determines whether to place the selector switch in one of the first switch position and the second switch position, wherein in the first switch position the computer controls the fluid pressure applied to the first face of the control mechanism and in the second switch position the computer controls the fluid pressure from the pressure source applied to the second side of the control mechanism.

12. The control system of claim 7, wherein the electrical command source is a computer.

13. An electro-pneumatic pressure control system used in a welding or like application pneumatically connected to a pressure source and electrically connected to an electrical command signal source which provides a level control signal, the electro-pneumatic pressure control system comprising:

a pressure controlled cylinder having a cavity and having an operating mechanism which effectively separates the cavity into a first section and a second section, the pressure controlled cylinder having an extend port in the first cavity section and a return port in the second cavity section, the operating mechanism having a first face and a second face, wherein the first face forms a boundary of the first cavity section and the second face forming a boundary of the second cavity section;

a selector switch having an input terminal connected to the electrical command signal source for receiving the level control signal and having a first output terminal and a second output terminal;

a first regulator valve having an electronic actuator connected to the first output terminal of the selector switch, a bidirectional port connected to the first port of the pressure control device, an input port connected to the pressure source and an exhaust port; and a second regulator valve having an electronic actuator connected to the second output terminal of the selector switch, a bidirectional port connected to the second port of the pressure control device, an input port connected to the pressure source and an exhaust port, wherein connecting the input terminal of the selector switch to the first output terminal of the selector switch places the first regulator valve in an activated state, directing fluid flow from the input port of the first regulator valve to the bidirectional port of the first regulator valve and to the extend port of the pressure controlled cylinder increasing pressure against the first face of the operating mechanism, and places the second regulator valve in a non-activated state, directing fluid flow from the return port of the pressure controlled cylinder through the bidirectional port of the second regulator valve to the exhaust port of the second regulator valve, causing the extension of the operating mechanism from the pressure controlled cylinder, and wherein connecting the input terminal of the selector switch to the second output terminal of the selector switch places the second regulator valve in an activated state, directing fluid flow from the input port of the second regulator valve to the bidirectional port of the second regulator valve and to the return port of the pressure controlled cylinder increasing pressure against the second face of the operating mechanism, and places the first regulator valve in a non-activated state, directing fluid flow from the extend port of the pressure controlled cylinder through the bidirectional port of the first regulator valve to the exhaust port of the first regulator valve, causing the retraction of the operating mechanism into the pressure controlled cylinder.

14. The control system of claim 13, wherein the electrical command signal source supplies a switch control signal and wherein the selector switch has a control terminal connected to the electrical command signal source for receiving the switch control signal, such that the switch control signal positions the selector switch in one of a first switch position connecting the input terminal of the selector switch to the first output terminal of the selector switch and a second switch position connecting the input terminal of the selector switch to the second output terminal of the selector switch.

15. The control system of claim 14, wherein one of the current level and the voltage level of the level control signal supplied by the electrical command signal source controls the fluid pressure communicated from the input port of the regulator valve in the activated state to the bidirectional port of the regulator valve in the activated state.

16. The control system of claim 15, wherein the electrical command signal source is a computer, such that the computer determines whether to place the selector switch in one of the first switch position and the second switch position, wherein in the first switch position the computer controls the fluid pressure communicated to the first face of the operating mechanism and in the second switch position the computer controls the fluid pressure communicated to the second face of the operating mechanism.

* * * * *